United States Patent Office 3,501,727
Patented Mar. 17, 1970

3,501,727
LIQUID-COOLED ELECTROMAGNETS
Wilhelm Kafka, Tennenlohe, Germany, assignor to Siemens Aktiengesellschaft, a corporation of Germany
Filed Mar. 14, 1967, Ser. No. 623,126
Claims priority, application Germany, Mar. 17, 1966, S 102,570
Int. Cl. H01f 5/00, 7/00
U.S. Cl. 335—300                                   10 Claims

ABSTRACT OF THE DISCLOSURE

A liquid-cooled electromagnet having a coil formed by a plurality of winding layers which coaxially surround the axis of the coil with the successive winding layers situated one within the other and spaced from each other at different radial distances, respectively, from the coil axis so that the winding layers define circumferential spaces between themselves. A holding means is located in these spaces to hold the winding layers together, and this holding means defines longitudinal cooling passages which are substantially parallel to the coil axis and which are adapted to receive the cooling liquid, these cooling passages being circumferentially distributed in the space between each pair of winding layers so that the cooling liquid will flow through the cooling passages to cool the winding layers.

My invention relates to electromagnets.

In particular, my invention relates to liquid-cooled magnet coils for high field intensities.

With coils of this type difficulties are encountered in absorbing the interior magnetic pressure and at the same time uniformly cooling the interior of the windings. Up to the present time it has been customary to provide heat bridges which extend from the ends of the coil into the interior of the windings and which have their ends in communication with a cooling liquid. Also, the coil windings are made of hollow wire so that within the wire there are passages through which the cooling liquid is directed. While the first solution to the problem, utilizing heat bridges, presents the difficulty of providing sufficient cooling for the winding wires situated at the interior of the coil, the second solution to the problem presents, because of the length and curvature of the cooling passages, the difficulty of quickly transporting to the exterior gas bubbles which form in the cooling liquid.

It is accordingly a primary object of my invention to provide for coils of this type a cooling arrangement which is superior to those thus far provided and which eliminates the difficulties encountered with the presently known solutions to the problem.

In particular, it is an object of my invention to provide cooling suitable for cryogenic coils, for water or oil cooled copper coils, and for superconductive coils, while avoiding all of the above disadvantages of the presently known solutions.

In accordance with my invention the liquid-cooled magnet coil is wound without end flanges and is formed by a plurality of winding layers held together by insulated tapes which extend in the direction of the axis of the coil and which are distributed about this axis so that the tapes define between themselves axial cooling passages. Also in accordance with my invention these cooling passages may be formed in a body of plastic in which the winding layers are embedded. With either of these constructions the cooling passages are placed in communication with a cooling-liquid supply means so as to receive cooling liquid therefrom.

The insulated tapes serve to mechanically strengthen the winding layers as well as to form the cooling passages. These cooling passages are parallel to each other and only have a length which is equal to the length of the coil. The axis of the coil is preferably arranged vertically. As a result, the cooling passages also extend vertically, and since the coil has no end flanges, gas bubbles can rapidly escape to the exterior without resistance. Because of the flue action which results from the structure of my invention, there is sufficient convection which is adequate for an average degree of development of heat within the coil. The interior of the coil is effectively and uniformly cooled.

It is of advantage, according to one embodiment of my invention, to fix the winding layers to each other by embedding them in a casting resin which is cast between and around the winding layers. This can be brought about in a simple manner, in accordance with the method of my invention, by winding the several winding layers onto an interior supporting cylinder while situating between the winding layers axially extending strips or tapes, at a predetermined distance from each other, made of a poorly wettable plastic, preferably a polymerized fluorohydrocarbon such as tetrafluorohydrocarbon, while also situating in certain cases supporting tapes on the carrier cylinder and on the individual winding layers. The spaces which are defined between these tapes are then filled with a casting resin which thus enters into the spaces between the winding layers, and after the resin sets the plastic tapes are removed. As a result the space formerly occupied by these plastic tapes forms cooling passages through the plastic body in which the winding layers are embedded. The liquid-supply means which supplies cooling liquid to the cooling passages includes a liquid container which is filled with wax before the casting resin is poured, and ends of the plastic tapes extend into the wax within the liquid container so that the casting resin is poured about these ends of the plastic tapes and into engagement with the wax in the liquid container. After the casting resin sets the wax is heated so that it will flow out of the container, and thus upon removal of the tapes there will be in the body of resin extending between the liquid container and the winding layers passages providing communication between the interior of the liquid container and the cooling passages which are situated between the winding layers.

In those cases where the coil is composed of superconductors, a pouring of casting resin will not be used, because once the casting resin has set it is not possible to unwind the coil and the expensive conductors of a superconductive coil would then become lost if any faults were encountered in the coil. For this latter type of construction axially extending tapes are used, these tapes themselves serving to hold together the winding layers of the coil and being arranged at such a distance from each other that the tapes define between themselves the required cooling passages for the cooling liquid.

My invention is illustrated by way of example in the accompanying drawings which form part of this application and in which.

Figure 8:
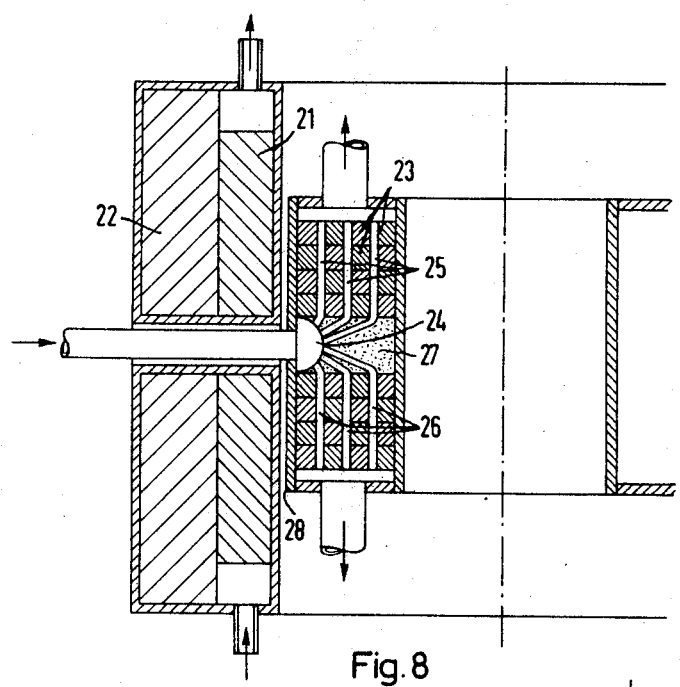
Figure 9:
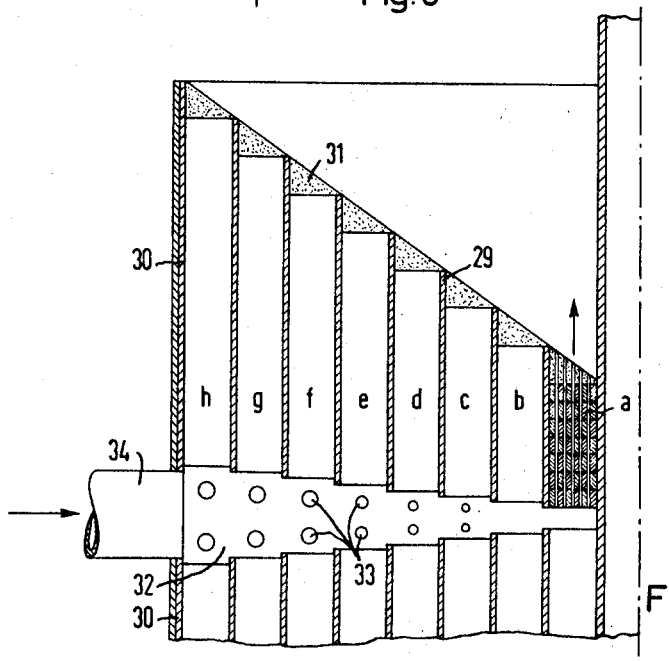

FIG. 8 is a schematic illustration of a combination of coils, FIG. 8 illustrating the structure in a sectional plane which contains the coil axis with the details of the structure being schematically represented only on one side of this axis while the structure is only fragmentarily illustrated on the other side of the coil axis; and FIG. 9 is a fragmentary schematic sectional elevation of a water-cooled exciting coil for particularly high field intensity and current density, the section of FIG. 9 being taken in a plane which contains the coil axis, and FIG. 9 showing only structure situated on one side of this axis.

Figure 1:
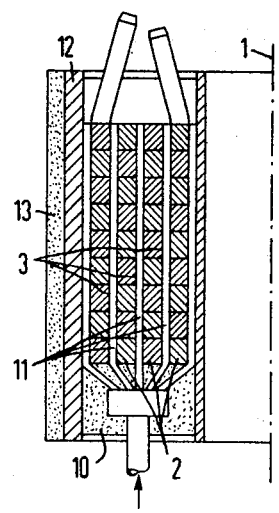
FIG. 1 is a longitudinal sectional elevation of one possible embodiment of a cryogenic coil according to my invention, the structure of FIG. 1 being taken in a vertical plane which includes the axis of the coil with FIG. 1 showing only the structure situated to one side of this axis, it being understood that this structure extends all around the coil axis.
Figure 2:
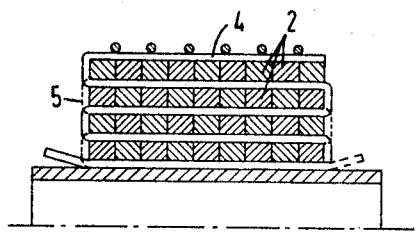
FIG. 2 shows, also in a sectional plane which includes the coil axis, with only the structure at one side of this axis being illustrated, another embodiment of a coil according to my invention.
Figure 3:
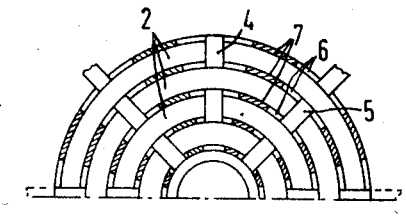
FIG. 3 is an end view of the structure of FIG. 2.

Referring to FIG. 1, there is shown therein a cryogenic coil having a vertical axis 1. With this construction the cooling medium, liquid nitrogen, for example, enters at the bottom and escapes as a gas at the top. The individual winding layers 2 are composed of copper of suitable profile, and each winding layer 2 is composed of a series of windings which define inner and outer cylindrical surfaces 3 for each winding layer, these surfaces being exposed so as to reduce the resistance to transfer of heat. However, the successive windings of each layer are insulated from each other. This construction is achieved by grinding away or otherwise removing the insulation from opposed sides of the copper wire or tape which initially is completely covered with an insulating lacquer, this removal of the insulation being carried out before winding of the copper into the winding layers and of course the insulation is removed from a pair of opposed surfaces of the wire. It is, however, also possible to achieve this construction by winding a completely exposed profiled copper wire and during the winding inserting insulation between the adjoining windings of each layer, as by inserting a glass silk tape between the windings of each layer. The coil is wound without any end flanges, and the winding layers are held together by insulated tapes 4 and 5, as illustrated in FIGS. 2 and 3. Thus, these tapes 4 and 5 form in the embodiment of FIGS. 2 and 3 a holding means for holding the winding layers together, and the tapes 4 and 5 extend parallel to the axis of the coil while being distributed about this axis in the spaces between the successive winding layers, so that the tapes 4 and 5 define in the spaces between the winding layers the cooling passages 6. As is apparent from FIGS. 2 and 3, the tapes 4 form one group of tapes of the holding means while the tapes 5 form a second group of tapes of the holding means, and all of these tapes extend in a serpentine manner from one winding layer to the next. Thus, as is shown in FIG. 2, the tape 4 which is visible therein extends around the left end of the outermost layer between the two outermost layers 2, and then around the right end of the second layer from the exterior of the coil to then pass between the second and third layers from the exterior of the coil, the tape 4 then passing around the left end of this third layer, as viewed in FIG. 4, to pass between the innermost pair of winding layers. On the other hand, each of the group of tapes 5, while being placed in a serpentine manner on the winding layers extends in an opposite direction so that each tape 5 extends around the left end of the second winding layer 2 from the outside of the coil, as viewed in FIG. 2, then around the right end of the third winding layer from the outside, as viewed in FIG. 2 and finally between the pair of innermost winding layers of FIG. 2, from the right toward the left, while the tape 4 extends between this pair of layers from the left toward the right. As a result the tapes 4 and 5 respectively extend around opposed ends of each winding layer to reliably hold them together.

Figure 4:
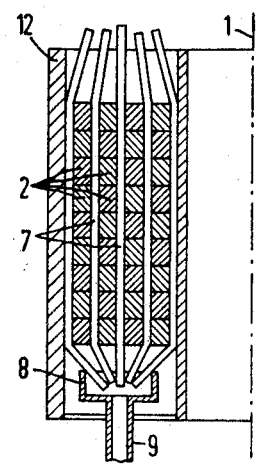
FIG. 4 illustrates the method of my invention used for manufacturing the embodiment of FIG. 1.

In the event that it is desired to increase the mechanical strength of the coil, the holding means can include a casting resin poured around the winding layers, and for this purpose, before pouring the casting resin plastic strips or tapes 7, of poor wettability, are situated in the spaces 6 between the successive winding layers, these strips 7 being indicated in FIGS. 3 and 4. As is apparent from FIG. 4, the plastic tapes 7 project beyond the ends of the winding layers, and at their lower ends they extend into a container 8 which is of circular configuration and which forms part of the cooling liquid supply means. This liquid supply means includes in addition to the container 8 a conduit 9 which communicates therewith for delivering the cooling liquid thereto.

In order to prevent filling of the container 8 and conduit 9 with casting resin when the latter is poured, the container 8 and conduit 9 are initially filled with wax up to the upper edge of the container 8, before the casting resin is poured, and it will be noted from FIG. 4 that the lower ends of the plastic tapes 7 will thus extend into the body of wax which thus becomes situated in the annular circular container 8 with which at least one supply pipe 9 communicates. The casting resin 10 is then poured through the spaces 6 to fill the latter as well as to fill the space around the annular container 8, and after the casting resin set the tapes 7 are removed so as to provide the construction shown in FIG. 1 where the body of plastic 10 has therein the cooling passages 11. These cooling passages 11 are formed by the spaces which were formerly occupied by the removed tapes 7. In the case where the windings of the coil are exposed to large magnetic forces, an additional outer band 12 of steel or an alloy of high tensile strength is provided around the coil. In addition there is provided in the embodiment of FIG. 1 an outer band 13 of insulation.

Figure 5:
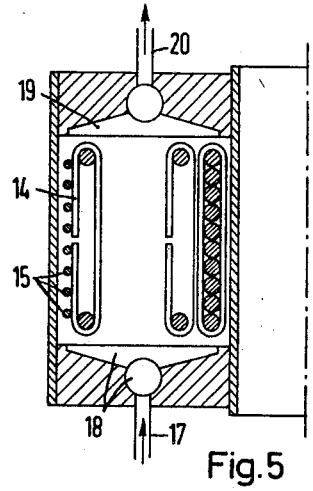
FIG. 5 is a schematic sectional elevation of a further embodiment of a coil according to my invention, FIG. 5 also showing the structure in a vertical sectional plane which contains the axis of the coil with the structure on only one side of this axis being illustrated.
Figure 6:
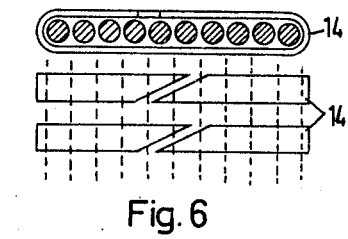
FIG. 6 is a schematic representation of the manner in which the holding means of FIG. 5 is arranged.
Figure 7:
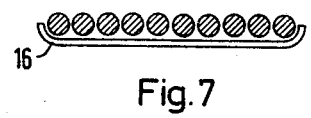
FIG. 7 is a schematic representation of an additional holding element which may be used with the embodiment of FIGS. 5 and 6.

FIG. 5 shows a superconductive winding having a vertical axis. With this embodiment the holding means takes the form of tapes 14 having the structure of insulated metal clips provided, as shown in FIG. 6, with inclined ends adjoining each other and of pointed configuration overlapping each other so as to have the construction which is particularly apparent from FIG. 6. The metal clips 14 have an insulating oxide layer and after each layer is wound are placed on the layer at both sides thereof, so that the clips 14 are held in the proper position by the pressure of the next outer layer. Initially, the clips have elongated ends which extend at right angles from their intermediate portions which extend parallel to the coil axis, and it is only after the particular layer is wound that these ends are bent through an additional 90° so as to form a 180° angle with the intermediate portion of each clip. The clips 14 are provided with the inclined ends shown in FIG. 6 so that these ends will not butt flush up against each other. The clips of the outermost winding layer are held in the proper position by a special outer winding 15 of a suitable tape, for example. The clips of each pair of successive layers are offset circumferentially with respect to each other so that they do not rest against each other but instead define between themselves cooling passages of predetermined circumferential width. If it is desired, after winding of several layers, to increase the number of clips circumferentially distributed about the coil axis, then either one of the layers will be without corresponding clips or individual tapes 16, as shown in FIG. 7, can be inserted, these tapes 16 only being curved at their ends in the manner shown in FIG. 7. These tapes 16 are also situated at those circumferential locations where the wire from one winding layer extends to the next winding layer. The clips can extend throughout the entire length of the coil or can be separated into a pair of sections extending inwardly from both ends of the coil.

FIG. 5 shows the supply conduit 17 of the cooling liquid supply means, this conduit 17 delivering the liquid helium into the annular liquid container 18 from which the cooling liquid is supplied to the cooling passages of the coil defined between the clips 14. The helium gas collects in the annular chamber 19 and is drawn off through the conduit 20.

FIG. 8 illustrates an embodiment of my invention which includes a magnet coil composed of a combination of coils, these coils being a superconductor coil and a water-cooled or a cryogenic coil. This construction serves for achieving particularly high field intensities. The superconductor coil is made up of a pair of winding sections 21 and 22 which have a construction similar to that of FIG. 5, the inner coil section 21 being composed of the superconducting material niobium-tin ($Nb_3Sn$), while for the outer coil section 22 niobium-titanium (NbTi) is used. The particular feature of the embodiment of FIG. 8 resides in the fact that the windings 23 which are cooled with water or nitrogen has a cooling system according to which the cooling liquid is delivered approximately midway between the ends of the coil. This inner coil of FIG. 8 has an upper section of winding layers 23 and a lower section of winding layers separated by and connected with the resin body 27 which is cast around the layers with suitable plastic strips, similar to the strips 7, forming the cooling passages 25 and 26 after these strips are removed. The body 27 is formed at its outer periphery with the liquid container 24 in the form of an annular groove surrounding the coil axis and forming the outer periphery of the body 27 between the upper and lower coil sections of the innermost coil, and it will be seen that the upper cooling passages 25 and the lower cooling passages 26 all communicate through the body 27 with the cooling liquid container 24. Thus, the holding means for the winding layers 23 is formed by the body of resin 27, and in addition the structure is held together by a steel ring 28 of great strength.

As is well known, a particularly small consumption of power is required if the windings are divided into coil sections with the length of the winding of each section being approximately equal to twice the diameter of the windings thereof while the current density from the interior toward the exterior of the coil is reduced in an inverse relationship with respect to the winding diameter. This result can also be achieved without dividing the current supply by enlarging the conductive cross section of one coil section to the next coil section or for the groups of coil sections. The maximum current density at the innermost coil section is determined by the cooling requirements. At the outermost coil section the cross section of the cooling passages can then be reduced and the amount of copper at this outermost section, the copper filling factor, can be increased.

FIG. 9 shows an embodiment of my invention constructed according to these concepts. The coil is composed of a plurality of winding sections a–h, with the sections of windings a–d being made of a copper-chrome alloy while the winding sections e–h are made of copper. Supporting cylinders 29 are made of a special steel or a copper-beryllium alloy. Radially extending rib plates 32 provided with openings 33 passing therethrough serve to absorb the axial forces. The entire winding package is embedded within a resin body 31. The cooling liquid supply means includes a liquid container which, as was the case with the embodiment of FIG. 8, is in the form of an annular ring-shaped chamber supplied with cooling liquid by way of one or more supply conduits 34.

I claim:
1. In a liquid-cooled electromagnet, a coil having a predetermined axis and composed of a plurality of winding layers coaxially surrounding said axis, at least partly overlapping each other, and spaced from each other respectively at different radial distances from said axis, so that said layers define between themselves spaces which circumferentially surround said axis, holding means extending at least partly into said spaces for holding said winding layers together and for defining in said spaces longitudinal cooling passages which are at least substantially parallel to said axis and which are circumferentially limited by said holding means, and cooling liquid supply means communicating with said passages for supplying cooling liquid thereto.

2. The combination of claim 1 and wherein said holding means includes a plastic body in which said winding layers are embedded, and said body being formed in said spaces, into which said body extends, with said cooling passages.

3. The combination of claim 1 and wherein said holding means includes a plurality of tapes situated in each of said spaces and circumferentially distributed therein about said axis so that the tapes in each space define between themselves said longitudinal cooling passages.

4. The combination of claim 3 and wherein said tapes extend substantially parallel to said axis in a serpentine manner first through one space and then around an end of a winding layer into the next space, and at least a pair of said tapes respectively extending around opposed ends of said winding layers.

5. The combination of claim 3 and wherein said tapes are composed of insulated metal.

6. The combination of claim 3 and wherein said tapes are composed of glass silk.

7. The combination of claim 3 and wherein said tapes are in the form of insulated metal clips.

8. The combination of claim 7 and wherein each of said clips terminates in a pair of ends which are adjacent each other and which are inclined across said tape to provide the latter with a substantially pointed configuration at each end thereof.

9. The combination of claim 1 and wherein said liquid-supply means includes a liquid container of circular configuration with which said passages directly communicate.

10. The combination of claim 1 and wherein said winding layers form a plurality of coil sections arranged one within another and connected in series with the conductive cross section of each coil section being greater than the next inner coil section but smaller than the next outer coil section while said cooling passages between each coil section and the next inner coil section have a greater cross section than the cooling passages between each coil section and the next outer coil section.

References Cited

UNITED STATES PATENTS 3,332,047    7/1967    Borchert _____ 335—216

FOREIGN PATENTS 645,561    7/1964    Belgium.
647,856    8/1964    Belgium.

GEORGE HARRIS, Primary Examiner

U.S. Cl. X.R.
335—216; 336—60